United States Patent
Eilam

(10) Patent No.: US 9,146,633 B1
(45) Date of Patent: Sep. 29, 2015

(54) TOUCH-BASED HOVERING ON REMOTE DEVICES

(71) Applicant: hopTo Inc., Campbell, CA (US)

(72) Inventor: Eldad Eilam, San Jose, CA (US)

(73) Assignee: hopTo Inc., Campbell, CA (US)

( * ) Notice: Subject to any disclaimer, the term of this patent is extended or adjusted under 35 U.S.C. 154(b) by 25 days.

(21) Appl. No.: 14/213,574

(22) Filed: Mar. 14, 2014

Related U.S. Application Data

(60) Provisional application No. 61/786,506, filed on Mar. 15, 2013.

(51) Int. Cl.
| | | |
|---|---|---|
| G06F 3/041 | (2006.01) | |
| G06F 3/0354 | (2013.01) | |
| G06F 3/0346 | (2013.01) | |
| G06F 3/03 | (2006.01) | |
| G06F 3/0488 | (2013.01) | |
| G09G 5/393 | (2006.01) | |

(52) U.S. Cl.
CPC .............. *G06F 3/041* (2013.01); *G06F 3/0317* (2013.01); *G06F 3/0346* (2013.01); *G06F 3/03545* (2013.01); *G06F 3/0488* (2013.01); *G09G 5/393* (2013.01)

(58) Field of Classification Search
None
See application file for complete search history.

(56) References Cited

U.S. PATENT DOCUMENTS

| | | | |
|---|---|---|---|
| 2011/0279397 A1* | 11/2011 | Rimon et al. | 345/173 |
| 2012/0212451 A1* | 8/2012 | Large et al. | 345/175 |
| 2015/0077326 A1* | 3/2015 | Kramer et al. | 345/156 |

* cited by examiner

*Primary Examiner* — Muhammad N Edun
(74) *Attorney, Agent, or Firm* — Lewis Roca Rothgerber LLP

(57) ABSTRACT

Systems and methods for touch-based hovering on remote devices are provided. A client device may include a touchscreen sensor capable of detecting that a user finger is within a predetermined distance from the touchscreen surface, but is not actually touching the touchscreen surface. When a user holds one or more fingers above a touch-enabled client device, the user fingers may be detected. Further, the screen coordinates of the fingers above the client device are determined. The coordinates, along with a command regarding a hover event, are sent to a host device with which the client device has an open remote session. The host device may execute the command in accordance with the coordinates to effect a hover event. Display instructions are sent from the host device to the client device, which generates a client device display including a hover event corresponding to that executed on the host device.

21 Claims, 2 Drawing Sheets

TOUCH-BASED HOVERING ON REMOTE DEVICES

CROSS-REFERENCE TO RELATED APPLICATIONS

The present invention claims the priority benefit of U.S. provisional patent application 61/786,506 filed Mar. 15, 2013, the disclosure of which is incorporated herein by reference.

BACKGROUND

1. Field of the Invention

The present invention generally relates to remote viewing. More specifically, the present invention relates to touch-based hovering on remote devices.

2. Description of the Related Art

Individuals currently have a variety of options for communicating and carrying out transactions. Such options may include traditional desktop computing devices, as well as various mobile devices (e.g., mobile phones, smartphones, tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunken, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Such is the case in many applications where content only uses a portion of the screen and user interface portions (e.g., toolbars, status bars, scroll bars, rulers).

Likewise, use of each particular device may vary based on its other specifications, including processing ability, memory, availability of applications, etc. For example, a desktop computer allows for multi-tasking involving the concurrent use of multiple applications, multiple documents, etc. The ability to multi-task on a mobile device may be more limited in comparison.

There is a need in the art for improved systems and methods for touch-based hovering on remote devices.

SUMMARY OF THE CLAIMED INVENTION

Embodiments of the present invention include systems and methods for touch-based hovering on remote devices. A client device may include a touchscreen sensor capable of detecting that a user finger is within a predetermined distance from the touchscreen surface, but is not actually touching the touchscreen surface. When a user holds one or more fingers above a touch-enabled client device, the user fingers may be detected. Further, the screen coordinates of the fingers above the client device are determined. The coordinates, along with a command regarding a hover event, are sent to a host device with which the client device has an open remote session. The host device may execute the command in accordance with the coordinates to effect a hover event. Display instructions are sent from the host device to the client device, which generates a client device display including a hover event corresponding to that executed on the host device.

Further embodiments may include methods for touch-based hovering on remote devices. Such methods may include initiating a remote session by way of a communication network between a client device and a host device, wherein the client device includes a touchscreen sensor capable of detecting that a user finger is within a predetermined distance from a surface of the touchscreen of the client device, detecting when a user holds one or more fingers within a predetermined distance from a surface of the client device, determining touchscreen coordinates for the user fingers that are detected, sending the determined touchscreen coordinates from the client device to the host device, the determined touchscreen coordinates associated with a command regarding a hover event, receiving display instructions from the host device, wherein the host device has executed the hover event in accordance with the determined touchscreen coordinates, and generating a user interface on the client device displaying a hover event corresponding to the hover event executed on the host device.

Embodiments of the present invention may further include systems for touch-based hovering on remote devices. Such systems may include one or more host devices, a client device, and/or a server (e.g., cloud server). When a user holds one or more fingers above a touch-enabled client device, the client device may detect and determine the screen coordinates of the fingers. A hover command is sent from the client device to a host device with which the client device has an open session. A hover event is effected on the host device in accordance with the determined coordinates. Display instructions are sent to the client device, which generates a display including a hover event corresponding to the hover event as executed on the host device.

Other embodiments of the present invention include non-transitory computer-readable storage media on which is embodied instructions executable to perform a method for touch-based hovering on remote devices as previously set forth above.

DETAILED DESCRIPTION

Systems and methods for touch-based hovering with remote devices are provided. A client device may include a touchscreen sensor capable of detecting that a user finger is within a predetermined distance from the touchscreen surface, but is not actually touching the touchscreen surface. When a user holds one or more fingers above a touch-enabled client device, the user fingers may be detected. Further, the screen coordinates of the fingers above the client device are determined. The coordinates, along with a command regarding a hover event, are sent to a host device with which the client device has an open remote session. The host device may execute the command in accordance with the coordinates to effect a hover event. Display instructions are sent from the host device to the client device, which generates a client device display including a hover event corresponding to that executed on the host device.

Figure 1:
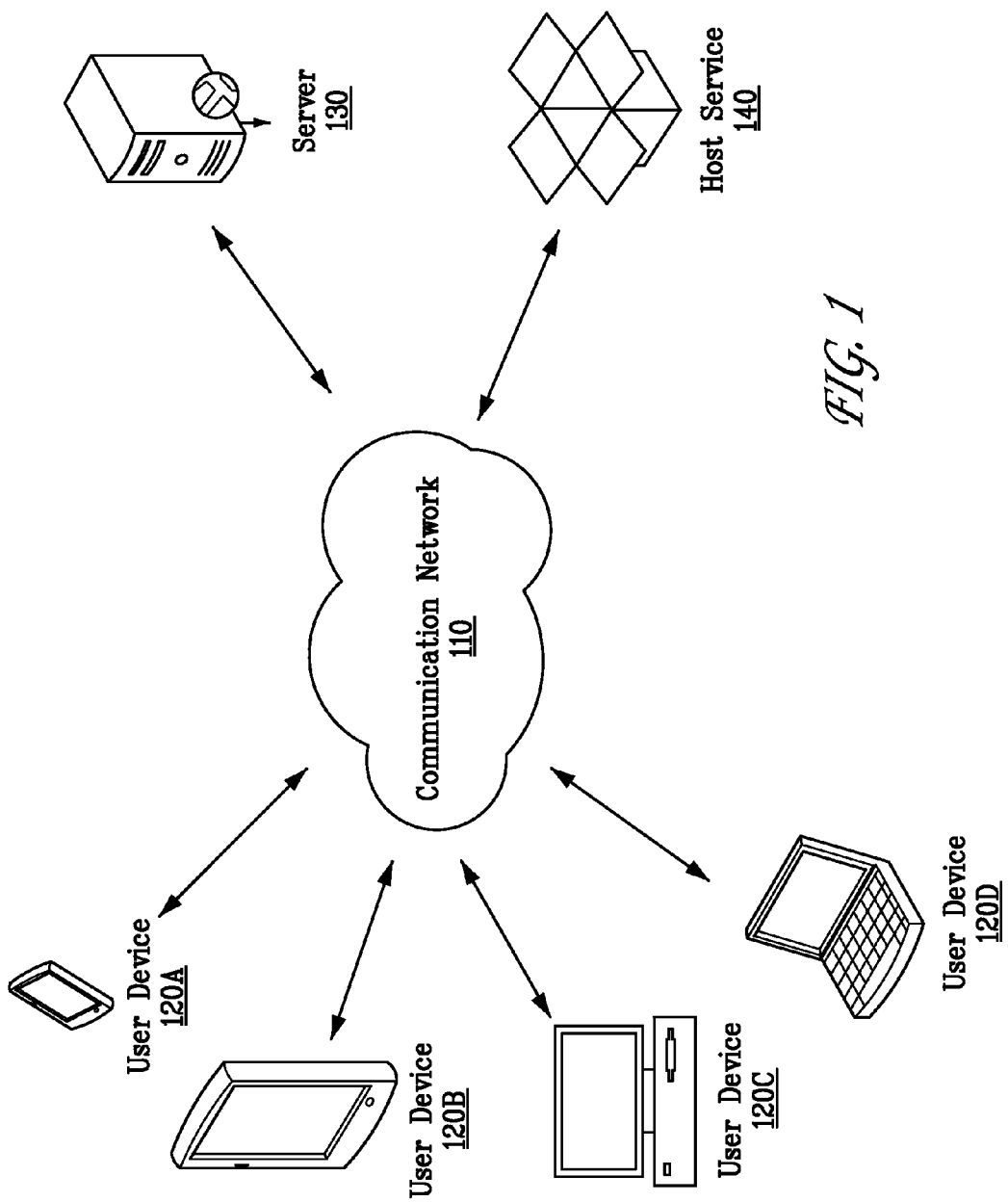
FIG. 1 illustrates a network environment in which an exemplary system for touch-based hovering on remote devices may be implemented.

FIG. 1 illustrates a network environment 100 in which a system for touch-based hovering with a remotely accessed user interface may be implemented. Network environment 100 may include a communication network 110, one or more user devices 120A-D, and a server 130. Devices and services in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic computing user devices 120A-D, which may include general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. Such devices 120A-D may also be configured to access data from other storage media, such as memory cards or disk drives as may be appropriate in the case of downloaded services. Such devices 120A-D may include standard hardware computing components such as network and media interfaces, non-transitory computer-readable storage (memory), and processors for executing instructions that may be stored in memory.

User device 120A is illustrated as a mobile phone or smartphone, user device 120B is illustrated as a tablet computing device, user device 120C is illustrated as a desktop computing device, and user device 120D is illustrated as a laptop computing device. As can be seen, each device is sized differently and/or has different input options. Exemplary embodiments of the present invention allow for tasks and applications that are specific to one device (e.g., operating in a Microsoft Windows® environment) to be used and optimized for another user device (e.g., operating in an Apple iOS® environment).

Each user device 120 may act as a host device interacting with another user device 120 that acts as a client; likewise, each user device 120 may act as the client device in communication with another user device 120 acting as a host. A user device 120 may further include a client application, a client 3D library, and a client display driver. Collectively, these elements may enable the user device and the user to consume computer graphics resources or services provided by server 110.

In the present application, certain user devices (e.g., user devices 120A-B) may have touchscreens. Such touchscreens may have sensors with a range of sensitivity. In addition to being able to detect when a user is touching the touchscreen, touchscreen sensors may adjusted to be sensitive enough to detect when, inter alia, a user's finger(s) is close but not actually touching the touchscreen. In some embodiments, the touchscreen sensors may be combined with optical information (e.g., from a camera) to detect when a user's extremity (e.g., finger) is in front of and within a certain small distance from the touchscreen surface.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may be associated with the same user and located in the same local network as user device 120. Alternatively, server 130 may be located remotely (e.g., in the cloud) and may be associated with a third party that provides services in accordance with embodiments of the present invention. In some instances, the services may be provided via software (e.g., software as a service) downloaded from server 130 to one or more user devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
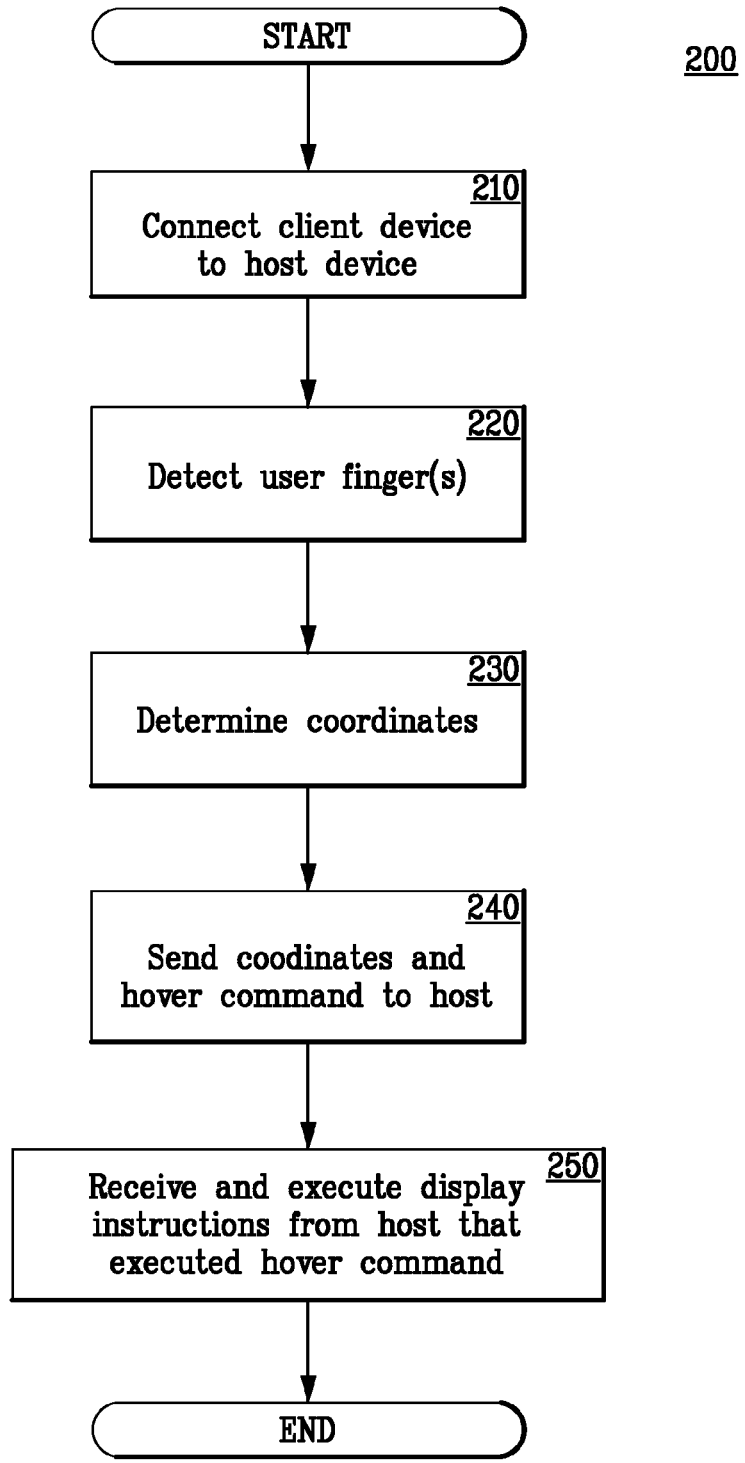
FIG. 2 is a flowchart illustrating an exemplary method for touch-based hovering on remote devices.

FIG. 2 illustrates a method 200 for touch-based hovering with a remotely accessed user interface. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, a client device is connected to a host device by way of a communication network, the user holds one or more fingers above the client device, the fingers are detected, screen coordinates of the fingers above the client device are determined, the coordinates and a hover command are sent from the client device to the host device for execution, the hover event is effected on the host device at a location corresponding to the coordinates, display instructions are sent from the host device to the client device, and a display is generated on the client device that includes a hover event corresponding to the hover event executed on the host device.

In step 210, a touch-enabled client device (e.g., client device 120B) is connected to a host device via an open session by way of a communication network. In some embodiments, client device 120B may connect to any host device (e.g., user devices 120C-D) that are connected to the communication network 110 and that allow a session to be opened with client device 120B. In some cases, a session may be opened using a software application downloaded to the host devices 120A-D participating in the session.

In step 220, a user holds one or more fingers close to a surface of the touchscreen of the client device 120B, and the fingers are detected by the touchscreen sensors. While the application refers to fingers, any body part of the user may also be detected, as well as certain finger substitutes (e.g., styluses).

In step 230, the touchscreen coordinates of the detected fingers are determined. In this regard, the client device 120B may be displaying a remote desktop corresponding to the desktop display of host device 120A. The touchscreen coordinates provide information as to one or more locations in the remote desktop above which the user's finger is hovering.

In step 240, a hover command and the coordinates determined in step 230 are sent from the client device 120B to the host device 120C with which the client device 120B has an open session. In a remote access system, such as client-server computing system 100, the "remoting" software may be installed and executing (i.e., "running") on a host device (e.g., host device 120C). Such software may allow users to remotely access applications that are installed on host device 120C. By way of example, a set of applications may be installed on host device 120C. Such applications represent any applications, programs, and/or processes executing (i.e., "running") on host device 120C. The functionality of the applications shall be visible to and accessible by client devices (e.g., client device 120B) via communication network 110 using a process herein known as application publishing, which is currently supported by such products as GraphOn GO-Global, Microsoft Remote Desktop Services, and Citrix XenApp. Such application publishing may be also performed in accordance with teachings of commonly-owned U.S. Pat. No. 5,831,609 filed Jun. 6, 1995 and entitled "Method and system for dynamic translation between different graphical user interface systems" which is incorporated by reference as though fully set forth herein. Such functionalities are also described in further detail in co-pending U.S. patent application Ser. No. 13/481,743, the disclosure of which is incorporated herein by reference.

In response to the hover command and coordinates, the host device 120B may execute a hover event at a location corresponding to the coordinates. The result of executing the hover event depends on what applications, files, or other objects are at the location. For example, pop-up menus or additional information regarding the application/file/object may appear in response to the hover command.

In step 250, display instructions are sent from the host device 120C to client device 120B, which executes such instructions to generate a display with a hover event corresponding to that effected as a result of step 240 on the host device.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for touch-based hovering on remote devices, the method comprising:

initiating a remote session by way of a communication network between a client device and a host device, wherein the client device includes a sensor capable of detecting that one or more user body parts is within a predetermined distance from a display of the client device;

executing instructions stored in memory, wherein execution of the instructions by a processor:

detect when a user holds one or more user body parts within a predetermined distance from the display of the client device, and determine touchscreen coordinates for the user body parts that are detected;

sending the determined touchscreen coordinates from the client device to the host device, the determined touchscreen coordinates associated with a command regarding a hover event;

receiving display instructions from the host device, wherein the host device has executed the hover event in accordance with the determined touchscreen coordinates; and generating a user interface on the client device displaying a hover event corresponding to the hover event executed on the host device.

2. The method of claim 1, wherein the user body parts comprise one or more fingers.

3. The method of claim 1, wherein the user body parts comprise a stylus that corresponds to the user body parts.

4. The method of claim 1, wherein executing the hover event on the host device results in a desktop display on the host device corresponding to a mouse hover event.

5. The method of claim 1, wherein executing the hover event on the host device results in generation of additional information on the desktop display on the host device.

6. The method of claim 1, wherein the detection of when a user holds one or more user body parts within a predetermined distance from the display of the client device is based on information captured by a touchscreen sensor of the client device.

7. The method of claim 1, wherein the detection of when a user holds one or more user body parts within a predetermined distance from the display of the client device is based on information captured by a camera of the client device.

8. A non-transitory computer readable storage medium having embodied thereon a program executable by a processor on a client device to perform a method for touch-based hovering on remote devices, the method comprising:
  initiating a remote session by way of a communication network between a client device and a host device, wherein the client device includes a touchscreen sensor capable of detecting that one or more user body parts is within a predetermined distance from a display of the touchscreen of the client device;
  executing instructions stored in memory, wherein execution of the instructions by the processor:
    detect when a user hold one or more body parts within a predetermined distance from the display of the client device, and
    determine touchscreen coordinates for the user body part that are detected;
  sending the determined touchscreen coordinates from the client device to the host device, the determined touchscreen coordinates associated with a command regarding a hover event;
  receiving display instructions from the host device, wherein the host device has executed the hover event in accordance with the determined touchscreen coordinates; and
  generating a user interface on the client device displaying a hover event corresponding to the hover event executed on the host device.

9. The non-transitory computer readable storage medium of claim 8, wherein the user body parts comprise one or more fingers.

10. The non-transitory computer readable storage medium of claim 8, wherein the user body parts comprise a stylus that corresponds to the user body parts.

11. The non-transitory computer readable storage medium of claim 8, wherein executing the hover event on the host device results in a desktop display on the host device corresponding to a mouse hover event.

12. The non-transitory computer readable storage medium of claim 8, wherein executing the hover event on the host device results in generation of additional information on the desktop display on the host device.

13. The non-transitory computer readable storage medium of claim 8, wherein the detection of when a user holds one or more user body parts within a predetermined distance from the display of the client device is based on information captured by a touchscreen sensor of the client device.

14. The non-transitory computer readable storage medium of claim 8, wherein the detection of when a user holds one or more user body parts within a predetermined distance from the display of the client device is based on information captured by a camera of the client device.

15. An apparatus for touch-based hovering on remote devices, the apparatus comprising:
  memory for storing an application that initiates a remote session by way of a communication network between a client device and a host device;
  a sensor capable of detecting that one or more user body parts is within a predetermined distance from a display of the client device;
  a processor that executes instructions stored in memory, wherein execution of the instructions by the processor:
    detect when a user holds one or more user body parts within a predetermined distance from the display of the client device, and
    determine touchscreen coordinates for the user body parts that are detected;
  sending the determined touchscreen coordinates from the client device to the host device, the determined touchscreen coordinates associated with a command regarding a hover event; and
  a communication interface for receiving display instructions from the host device, wherein the host device has executed the hover event in accordance with the determined touchscreen coordinates;
  wherein the processor executes further instructions to generate a user interface on the client device that displays a hover event corresponding to the hover event executed on the host device.

16. The apparatus of claim 13, wherein the user body parts comprise one or more fingers.

17. The apparatus of claim 13, wherein the user body parts comprise a stylus that corresponds to the user body parts.

18. The apparatus of claim 13, wherein the execution of the hover event on the host device results in a desktop display on the host device corresponding to a mouse hover event.

19. The apparatus of claim 13, wherein the execution of the hover event on the host device results in generation of additional information on the desktop display on the host device.

20. The apparatus of claim 13, further comprising a touchscreen sensor, wherein the detection of when a user holds one or more user body parts within a predetermined distance from the display of the client device is based on information captured by a touchscreen sensor.

21. The apparatus of claim 13, further comprising a camera, wherein the detection of when a user holds one or more user body parts within a predetermined distance from the display of the client device is based on information captured by the camera.

* * * * *